(12) United States Patent
Burke et al.

(10) Patent No.: US 6,508,000 B2
(45) Date of Patent: Jan. 21, 2003

(54) TRANSIENT LIQUID PHASE BONDING REPAIR FOR ADVANCED TURBINE BLADES AND VANES

(75) Inventors: Michael A. Burke, Pittsburgh; Gary W. Swartzbeck, N. Huntingdon; Paula D. Freyer, Fombell, all of PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/779,208

(22) Filed: Feb. 8, 2001

(65) Prior Publication Data

US 2002/0148115 A1 Oct. 17, 2002

(51) Int. Cl.⁷ .................................. B23P 15/00
(52) U.S. Cl. ................. 29/889.1; 29/889.7; 29/402.03; 228/119
(58) Field of Search .................... 29/889.1, 889.72, 29/402.03, 889.7, 889.71, 402.08, 402.13; 228/119, 190, 225

(56) References Cited

U.S. PATENT DOCUMENTS

| | | | |
|---|---|---|---|
| 4,326,833 A | 4/1982 | Zelahy | |
| 5,033,938 A | 7/1991 | Fraser | |
| 5,697,151 A | 12/1997 | Werner | |
| 5,822,852 A | 10/1998 | Bewlay | |
| 5,836,075 A | 11/1998 | Fitzgerald | |
| 5,913,555 A | 6/1999 | Richter | |
| 6,193,141 B1 * | 2/2001 | Burke et al. | 228/190 |
| 6,325,871 B1 * | 12/2001 | Burke et al. | 148/522 |
| 6,331,217 B1 * | 12/2001 | Burke et al. | 148/410 |

* cited by examiner

Primary Examiner—I Cuda Rosenbaum

(57) ABSTRACT

A method of repairing gas turbine engine components is provided. The method includes removing the damaged portion and fabricating an insert to match the removed portion. The insert is precision machined and crystallographically matched to the original component, and then bonded to this component using transient liquid phase bonding techniques and suitable heat treatment.

18 Claims, 8 Drawing Sheets

REPAIRED DS BLADE TIP

TRANSIENT LIQUID PHASE BONDING REPAIR FOR ADVANCED TURBINE BLADES AND VANES

GOVERNMENT CONTRACT

The Government of the United States of America has certain rights in this invention pursuant to Contract No. 70NANB5H1131 awarded by NIST.

BACKGROUND OF THE INVENTION

1. Field of the Invention

The present invention relates to a method of repairing hot section high performance nickel based turbine components using transient liquid phase bonding techniques.

2. Description of the Prior Art

Components of gas turbine engines such as blades and vanes are exposed to a high stress environment which can include mechanical, thermal and rotational stressors. Due to the high cost of high performance hot section turbine components, it is desirable to repair such components rather than replace them. A variety of methods currently exist for repairing gas turbine components.

U.S. Pat. No. 5,913,555 provides a method of repairing worn blade tips of compressor or turbine blades wherein the blade tip is removed, a repair part is machined and attached by welding or soldering.

U.S. Pat. No. 4,326,833 discloses and claims a method for repair of gas turbine engine air cooled blade members which includes removing a blade segment from the blade, providing a replacement member of the same material, size and shape as the removed segment and metallurgically bonding the replacement member through non-fusion techniques.

U.S. Pat. No. 5,033,938 discloses and claims a method of repairing turbine blades comprising removing damaged portions of the turbine blade and forming steel into a shape that conforms to the removed portion, and thereafter welding the insert into the turbine blade.

U.S. Pat. No. 5,822,852 provides a method for repairing blade tips using brazing or welding techniques.

New methods to provide high quality bonding of fabricated repair inserts to pre-existing gas turbine components continue to be sought.

SUMMARY OF THE INVENTION

Accordingly, the present invention provides a method of repairing blades and vanes of a gas turbine engine that have been damaged in service or during the manufacturing process, using transient liquid phase bonding techniques. The damaged portion is extracted and an insert of substantially the same material as the component to be repaired is fabricated to replace the damaged part. The insert is joined to the component using transient liquid phase bonding with a bond that is no larger than necessary to bond the insert to the component. The repaired component has a structural bond that closely resembles the base material in structure, mechanical properties and performance. In addition, the bond between the fabricated insert and the component base materials is best formed along bond planes, selected after mechanical and thermal analysis, which are determined to be low stress planes. The bonding of the new part to the old thus takes place in a low stress region having local material requirements significantly below the capabilities of the base material and below the capabilities of the transient liquid phase bond.

It is an object of the invention therefore to provide a method of repairing gas turbines using transient liquid phase bonding techniques.

It is a further object of the invention to repair gas turbines using transient liquid phase bonding techniques with bond planes located in regions of low mechanical and thermal stress.

It is an additional object of the invention to provide a repaired gas turbine engine component having a repair bond that closely matches the structural, mechanical and performance properties of the base material.

These and other objects of the invention will become evident from the description, the drawings and the appended claims.

DESCRIPTION OF PREFERRED EMBODIMENTS

The present invention provides a method of repairing damaged blades or vanes of gas turbine engines. A damaged blade or vane (damaged either during manufacture or in-service) containing localized physical damage (i.e., only one or a few regions or areas of the blade are damaged while the remainder of the structure is still acceptable and functional) is repaired by selectively removing the damaged region and replacing it by a matched insert that is bonded in place using transient liquid phase bonding techniques and then suitably heat treated to restore material properties to an acceptable level.

Figure 1:
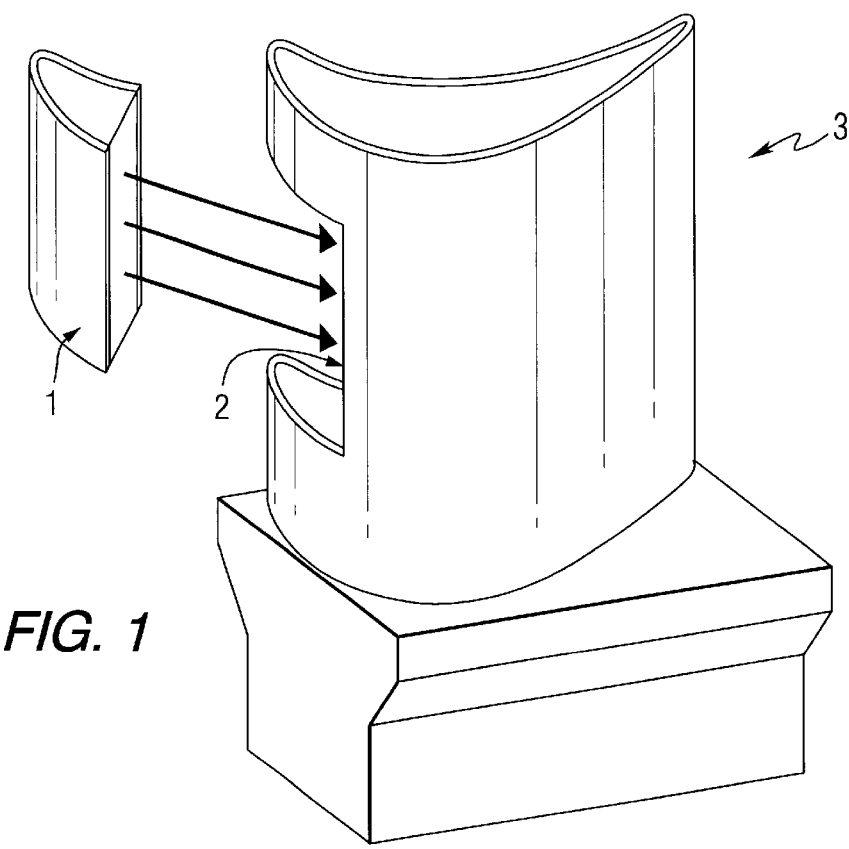
FIG. 1 is a schematic of the present invention which shows using an insert to repair a machined section of a blade.

More specifically, the method includes: identifying the damaged region; performing a mechanical and thermal analysis to identify potential bond planes around the damaged region that will be low stress planes and preferable for bonding; off-line fabrication of matched inserts, i.e., small castings of the region identified by the mechanical and thermal analysis; extraction machining of the damaged section of the blade; precision machining and matchup of the insert and the machined remaining segment of the blade, for example, by Co-EDM machining, to prepare precise profile matching segments; transient liquid phase bonding of the insert into the missing portion of the blade using a bond medium and thermal method developed to optimize the mechanical and physical properties of the resulting bond; and remachining, coating and thermal treatment of the blade. As used herein, the term "matchup" refers to the process by which inserts are crystallographically and structurally aligned with the component being repaired. FIG. 1 illustrates the general concept of the present invention in that it shows a structurally matched insert 1 bonded to a machined section 2 of a blade 3 to develop a repaired blade.

While the principles of the method can be applied to several different components and materials, the details of the actual procedures will depend on the component (blade or vane), configuration (tip, edge, root, shroud, airfoil, thin skin) and material (single crystal (SC), directionally solidified (DS), conventionally cast (CC) or hybrid, i.e. SC-DS, SC-CC, etc.) to be repaired or replaced.

Figure 4:
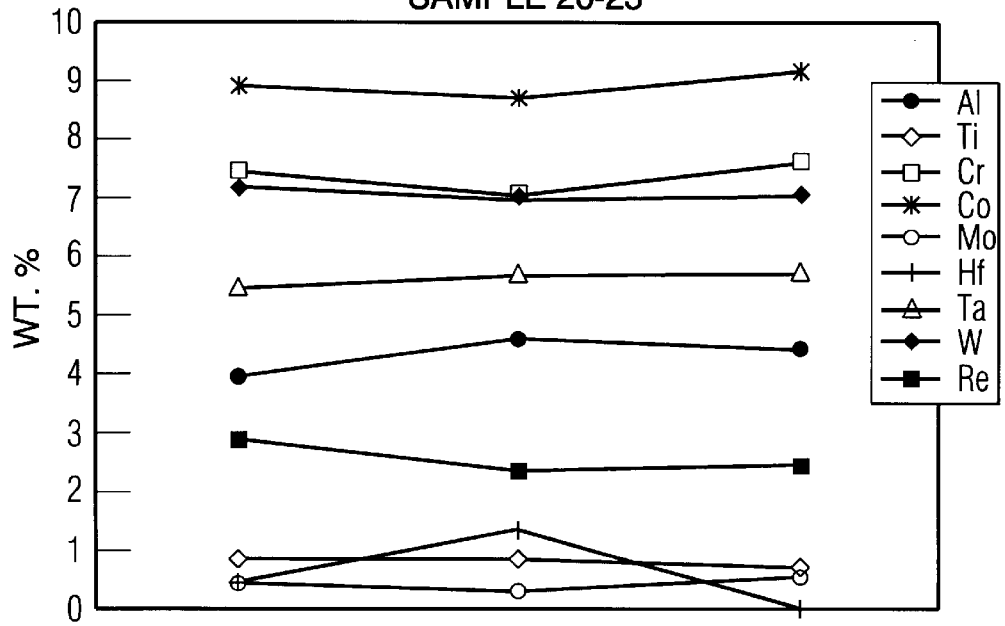
FIG. 4 is a montage of chemical profiles taken across a transient liquid phase bond in a nickel based single crystal alloy.
Figure 2:
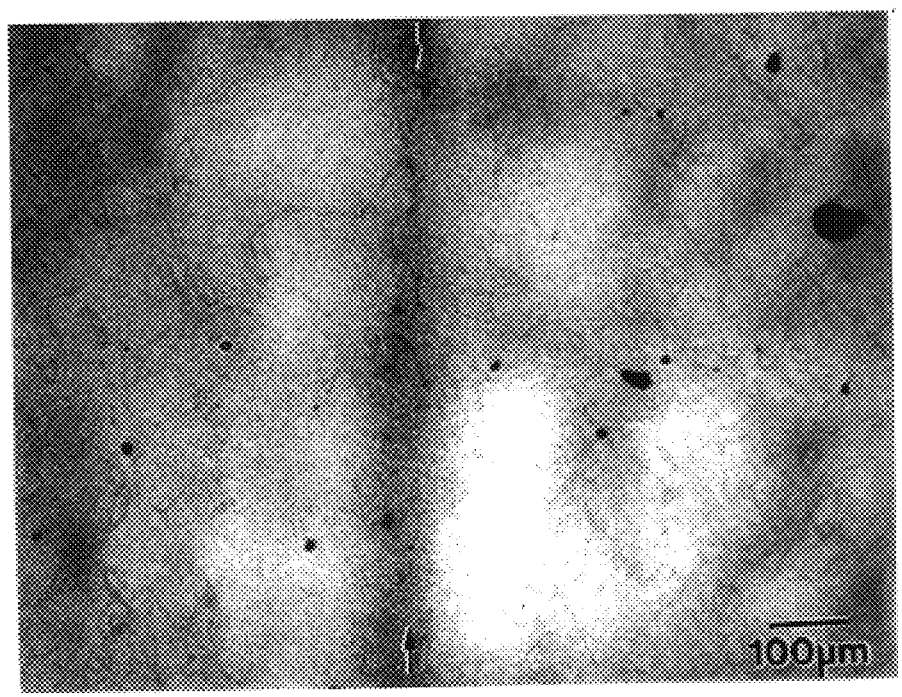
FIG. 2 is a light optical photograph showing a cross-sectional view of a transient liquid phase bond in a nickel based single crystal alloy.
Figure 3:
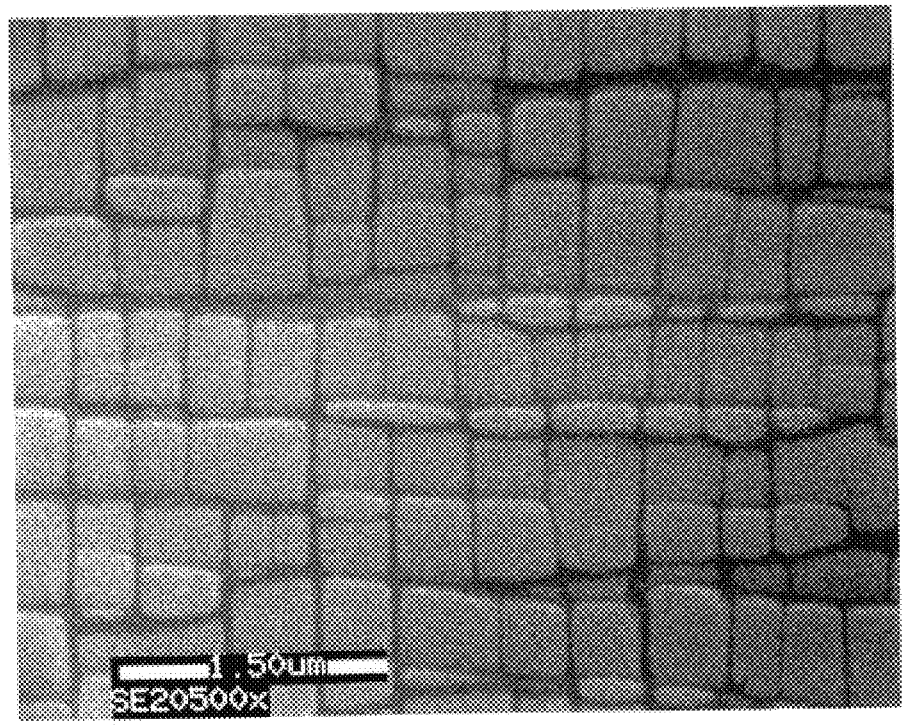
FIG. 3 is a higher magnification SEM (scanning electron microscope) photograph of a cross-section across a transient liquid phase bond in a nickel based single crystal alloy.

Transient liquid phase bonding media have been developed for several materials. The bond medium must be well matched in chemistry to the base material so that when solidified, the bond forms a structure that is essentially similar to that of the base material.

illustrate generally that suitably matching bond foils with the base material produces a bond joint that is essentially indistinguishable from the base material. FIG. 2 shows a bond joint that cannot be identified by optical microscopy; the microstructure of the material is uniform across the bond joint. FIG. 3, scanning electron microscope photograph cross-section as in FIG. 2 but at higher magnification, shows that the fine scale gamma-prime microstructure is continuous and uniform across the bond joint. It is this uniform cuboidal gamma/gamma prime microstructure that provides optimum strength in high performance SC superalloys. FIG. 4 provides evidence that chemical composition is uniform across the bond line when the bond foil is matched to the base metal. Uniformity in microstructure and chemical composition across the bond line results in repaired materials having optimum properties (properties substantially identical to those of the original material).

Transient liquid phase bonding is a joining process that produces high quality joints or bonds for replacement sections in superalloys. In this process, a thin strip of bonding material, e.g., foil or agglomerate paste, is placed between the two portions of the material to be bonded. The bonding material is similar to the base material but also contains a melting point depressant, such as from about 1 to about 3 weight percent boron, that exhibits rapid solid state diffusion in the alloy. For nickel based alloys Si and B are preferred melting point depressants, although in high temperature applications such as those used to make single crystal

TABLE 1

Single crystal and polycrystalline turbine blade alloys (wt %)

| Alloy | Ni | Cr | Co | Al | Ti | Nb | Mo | Ta | W | Re | Hf | Zr | B | C | Vol % γ' |
|---|---|---|---|---|---|---|---|---|---|---|---|---|---|---|---|
| CMSX-4 | bal | 6.6 | 9.6 | 5.5 | 1.0 | | 0.6 | 6.5 | 6.4 | 3 | 0.9 | | | | 62 |
| PWA1484 | bal | 5 | 10 | 5.6 | 1 | | | 8.7 | 6 | 3 | 0.1 | | | | 64 |
| PWA1480 | | 10 | 5 | 5 | 1.5 | | | 12 | 4 | | | | | | 63 |
| SC16 | | 16 | | 3.5 | 3.5 | | 3 | 3.5 | | | | | | | 41 |
| CMSX-11 | | 12.5 | 7 | 3.4 | 4.2 | 0.1 | 0.5 | 5 | 5 | | 0.04 | | | | ~45 |
| CM247 | | 8.1 | 9.2 | 5.6 | 0.7 | | 0.5 | 3.2 | 9.5 | | 1.4 | 0.015 | 0.015 | 0.07 | 62 |
| MarM002 | | 9 | 10 | 4.7 | 1.7 | 1 | | | 12.5 | | | | | | 57 |
| MarM002 + Hf | | 9 | 10 | 5 | 2 | 1 | | | 12.5 | | 1.8 | 0.06 | 0.02 | 0.14 | 58 |
| MarM246 | | 9 | 10 | 5.5 | 1.5 | | 2.5 | 1.5 | 10 | | | 0.06 | 0.015 | 0.15 | 65 |
| CM186 | | | | | | | | | | | | | | | |
| 1N792 | | 12.4 | 9 | 4.5 | 4.5 | | 1.8 | 3.9 | 3.9 | | 1 | 0.02 | 0.015 | 0.08 | 45 |
| 1n738 | | 16 | 8.5 | 3.4 | 3.4 | 0.9 | 1.75 | 1.75 | 2.6 | | | 0.1 | 0.01 | 0.11 | 37 |

TABLE 2

Bond foil chemistries (wt %)

| Foil Type | Ni | Cr | Co | W | Ta | Mo | Fe | Hf | Al | Ti | B | C | Si |
|---|---|---|---|---|---|---|---|---|---|---|---|---|---|
| NiFlex 110 1.3B | Bal | 10 | 5.0 | 4.0 | 4.0 | | | | 2.0 | | 1.3 | | |
| NiFlex 110 1.7B | Bal | 10 | 5.0 | 4.0 | 4.0 | | | | 2.0 | | 1.7 | | |
| NiFlex 110 2.5B | Bal | 10 | 5.0 | 4.0 | 4.0 | | | | 2.0 | | 2.5 | | |
| NiFlex 115 3.0B | Bal | 9.0 | 8.0 | 4.0 | 4.0 | | | 1.0 | 2.0 | | 3.0 | | |
| NiFlex 120 1.7B | Bal | 10.0 | 5.0 | 5.0 | 3.0 | | | | 1.3 | 1.0 | 1.5 | | |
| NiFlex 120 1.9B | Bal | 10.0 | 5.0 | 5.0 | 3.0 | | | | 1.3 | 1.0 | 1.7 | | |
| NiFlex 121 2.4B | Bal | 10.0 | 10.0 | 5.0 | | | | | | | 2.4 | | |
| NiFlex 121 3.0B | Bal | 10.0 | 10.0 | 5.0 | | | | | | | 3.0 | | |
| MBF20/20A | Bal | 7 | | | | | 3 | | | | 3.2 | 0.06 | 4.5 |
| MBF80/80A | Bal | 15.2 | | | | | | | | | 4 | 0.06 | |

Tables 1 and 2 list available alloy compositions and bond foils. The matching of bond foils to base materials for repair can be developed from these tables. FIGS. 2, 3 and 4 components Si can cause corrosion concerns. The bonding material is applied in a thickness of between about 0.0005 inches to about 0.010 inches, with a preferred range of thickness of about 0.001 inches to about 0.005 inches. Most preferred is a thickness between about 0.001 inches to about 0.002 inches.

The present process is conducted substantially isothermally at a temperature that lies above the melting point of the foil but below the bulk melting point of the base material. As the boron rich foil melts it wets the base material on either side of the bond and causes some dissolution of the base metal and a wider liquid zone. As the liquid zone widens the concentration of boron in the liquid falls until the melt pool is sufficiently diluted in boron and is at the equilibrium liquidus concentration. Simultaneously solid state diffusion causes boron to be removed from the bond pool environs. These two processes result in depletion of the melting point depressant from the bond pool and isothermal resolidification of the bond pool until the two solidification fronts meet at approximately the center line of the bond.

By carefully controlling the chemistry of the bond medium and the temperature of the bonding process, the process can reproduce the chemistry and microstructure of the base material within the bond zone. The base material composition and its melting point, the bond foil major element composition, the amount of boron and the temperature for isothermal bonding are all interacting variables that determine the chemistry and structure of the bonds produced by the method of the present invention.

The amount of melting point depressant should be sufficient to provide a bonding foil that will melt significantly (i.e., a few hundred F) below the base material. The addition of boron to a nickel based alloy depresses its melting point by about 100 to 150 F per each weight percent addition. With melting points of over 2,400 F, and incipient melting points of the segregated as-cast form somewhat lower, foils comprising from about 1 to about 3 weight percent boron can reduce the melting point to within the 2,000 to 2,300 F regime that will allow for localized but no overall melting.

The amount of bonding foil should be sufficient to produce melting of the base material and provide a fine well controlled bond joint. Bonding using, for example, 0.0025 cm (0.001 inch) thick foil material or its equivalent in paste provides for sufficient melting and resolidification during bonding. Melting and resolidification should be well controlled so that deleterious chemical and phase separation does not occur within the bond zone.

The major element chemistry of the bond foil (i.e., Ni, Cr. Co, Al, Ti, Ta, W, Mo, Nb etc.) should be well matched to the material to be bonded so that the chemistry and structure of the bond zone are effectively continuous with those of the base material. However, the bond foil composition does not have to be identical to that of the base material as some mixing takes place in the molten zone; considerable differences can be tolerated. For example, Al and Ti can be removed from the bond foil to avoid formation of deleterious gamma prime eutectics at the bond center line. Expensive elements such as rhenium can be eliminated to reduce costs.

Surfaces for transient liquid phase bonding may be prepared by low stress grinding if the surface is sufficiently planar, by electrodischarge machining (EDM) or by electrochemical (ECM) where electrical conditions are sufficient to maintain a spark gap of about 0.0025 cm (0.001 inch) between the work piece and the work tool. For parts of complex profile that must fit together, such a surface profile can be produced by a Co-EDM or Co-ECM process which employs one of the mating pieces as the process anode and the other as the cathode. Because parts taken from service do not retain their original profile, it is sometimes necessary to cast inserts that are larger than would otherwise be required. Such inserts can be cast between 10–200 mils larger than needed. The insert and the part are then adaptively machined to produce the best fit of component segments. Co-EDM and Co-ECM are especially suitable processes to produce such optimal matching of inserts to original parts. As used herein, the phrase "precision machining" refers to such processes.

Superalloy gas turbine components, during the initial casting process, are typically subjected to solution heat treatment followed by an "aging" or precipitation heat treatment. When using transient liquid phase bonding methods, the component is additionally subjected to high bonding temperatures to produce the bond. This high temperature bonding step can occur either before or after the solution heat treatment step. In some cases, depending on the type of material, it is preferable to forego solution heat treatment to avoid recrystallization or to prevent melting of the bond region altogether. In other situations, it may be possible to solution heat treat the parts individually, prior to the bonding step. It is expected that, in general, heat treatment methods required to repair a service exposed component will be different from those required to heat treat virgin components. This will be particularly true for single crystal materials. Specifically, solution heat treatment processes that do not induce recrystallization in newly fabricated components may induce undesirable recrystallization in components that have been exposed to service and have incurred a significant amount of cold work.

Bonding temperatures should be sufficient to melt the bond foil and a similar thickness of the base material to produce a fine, well mixed bond zone. It is also necessary in some instances to provide heat treatment after bonding to redissolve overaged structures and rejuvenate the remainder of the service run material. The specific temperature ranges that are appropriate for the bonding process and the subsequent heat treatment will depend on the type of material being repaired.

For conventionally cast (CC) material, bonding temperatures will generally be lower than those for single crystals and are very similar to the recommended solution heat treatment temperatures for these alloys (see Table 3). Because the grain boundary phases in polycrystalline (CC) alloys can give rise to incipient melting, it is always preferable to heat treat at lower temperatures. These lower bonding and solution heat treatment temperatures avoid incipient melting.

TABLE 3

Recommended solution heat treatment and bonding temperatures of polycrystalline alloys (with single crystal CMSX-4 for comparison)

| Alloy | Solution Heat Treatment Temperature | Recommended Bonding Temperature |
| --- | --- | --- |
| IN738 CC | 2150 F. | 2150 F. |
| CM247 CC or DS | 2250 F. | 2200 F. |
| CMSX-4 SC | 2410 F. | 2250 F. |

Because conventionally cast polycrystalline materials are isotropic, there is no need to match orientation or structure when joining polycrystalline cast inserts to polycrystalline service run parts. However, grain sizes can have an effect on material properties, so inserts should be cast in a similar manner to the original parts in order to match structure and properties across the bond interface.

Recommended thermal and chemical processes for DS materials are similar to those recommended for conventionally cast polycrystalline materials. Because DS materials contain the same low melting point/incipient melting phases present in their conventionally cast counterparts, the temperatures and bonding media are similar to those employed for cast CC alloys. Again, the bonding process can be considered the equivalent of the high temperature, pseudo-solution heat treatment that is employed in conventional reheat treatment and rejuvenation heat treatment of such alloys.

Thermal processing of service run DS alloys must be at temperatures low enough to avoid recrystallization. DS alloys may develop stored energy as a result of low temperature deformation during the service cycle; release of this stored energy is the thermodynamic driving force for recrystallization. Recrystallization produces equiaxed regions within the structure and destroys the benefits imparted by the aligned crystallographic and grain boundary structures. Thus, bonding temperatures should be low enough to prevent recrystallization. This temperature will be the same as that employed in the thermal rejuvenation cycle of service exposed (but not bond repaired) DS blades.

Because of the intentionally aligned structure of DS alloys, a repair method based on a patch or insert must carefully avoid developing discontinuities in structure across the bond line. The insert should be of the same grain size and alignment as the original structure. To accomplish this, DS inserts should be grown in the same orientation and at the same rate as the original structure. Such similar alignment of the inserts and the original parts are displayed in FIGS. 5 and 6, in which the mottling or striations of the insert are matched to those of the original part so that the alignment continues across the bond line.

Repair of single crystal materials involves bonding temperatures that will be higher than those used for conventionally cast or DS materials. As Table 3 indicates, the recommended bonding temperature for CMSX-4 is about 100° F. higher than that recommended for its conventionally cast or DS counterpart CM247. For virgin material the bonding cycle is usually followed by a full heat treatment; full heat treatment cannot be utilized for service exposed material.

Thermal treatment of service exposed SC materials requires a lower temperature solution heat treatment step than that required for virgin SC materials. Often, no solution heat treatment is necessary if the bonding heat treatment temperature is sufficiently high. Service exposed single crystal alloys may recrystallize if exposed to the original solution heat treatment of 2400° F. This temperature is not required to diffuse the (boron) melting point depressing media from the bond or to re-solution most of the internal gamma-prime structure that has coarsened during service. Temperatures of around 2100° F. to 2250° F. do not induce recrystallization in moderately deformed SC samples and can be employed to rejuvenate single crystals or in bonding and diffusion cycles for repair of single crystal components.

A thermal process for bonding service run ingle crystals should consist of a schedule similar to hat shown in Table 4.

TABLE 4

Heat treatment processes for SC materials (e.g., CMSX-4)

| Service Run | New "Insert" or Skin |
|---|---|
| Pre-treatment at 2100° F. to 2300° Co-machine | Solution Heat Treatment >2400° F. |
| Bonding at 2100° F. to 2300° F. | |
| Diffusion at 2100° F. to 2300° F. | |
| Aging at 1900° F. to 2100° F. to regenerate gamma-prime structure | |
| Coating etc. | |

Note that although this process produces mechanical properties that are lower than those for bonded material that has undergone full solution heat treatment after bonding, the difference is small.

Table 5 contains data from a previous investigation which demonstrates that the tensile properties of bonded CMSX-4 are still quite high whether or not the bonded material is given a post-bond solution heat treatment step. Cycle N as-cast materials were subjected to bonding treatment followed by precipitation heat treatment; Cycle O materials were solution heat treated prior to bonding and precipitation heat treatment. Cycle B materials were solution heat treated, bonded, solution heat treated again, followed by precipitation heat treatment. Cycle I materials, as-cast, were subjected to bonding treatment, solution heat treatment and then precipitation heat treatment. Clearly, material that has been heat treated with Cycles N or O has properties that approach those of material subjected to the 2400° F. solution heat treatment temperature.

TABLE 5

Tensile test results for bonded CMSX-4

| Temperature ° K. (° C., ° F.) | Processing | Location of Failure | Yield Strength MPa (ksi) | UTS MPa (ksi) | Elongation % | R.A. % |
|---|---|---|---|---|---|---|
| Room | Typical Value | Base | 896 (130) | 931 (135) | 14 | 18 |
| | B - Ni-Flex 110, 2.5% B, S + B + S + P | Base | 965 (140) | 1,048 (152) | 13.5 | 16.1 |
| | N - Ni-Flex 110, 1.3% B, A-C: B + P | Base | 807 (117), 814 (118) | 979 (142), 1,082 (157) | 14.5, 25.4 | 15.4, 24.4 |
| | O - Ni-Flex 110, 2.5% B, S + B + P | Base | 765 (111) | 841 (122) | 14.7 | 17.1 |
| | I - Ni-Flex 110, 1.3% B, A-C: B + S + P | Base | N/R | 945 (137) | 2.6 | 6.4 |
| 1172 (899, | Typical Value | Base | 758 (110) | 103 (150) | 18 | 37 |

TABLE 5-continued

Tensile test results for bonded CMSX-4

| Temperature ° K. (° C., ° F.) | Processing | Location of Failure | Yield Strength MPa (ksi) | UTS MPa (ksi) | Elongation % | R.A. % |
|---|---|---|---|---|---|---|
| 1650) | B - Ni-Flex 110, 2.5% B, S + B + S + P | Base | 786 (114) | 965 (140) | 3.4 | 5.9 |
|  | N - Ni-Flex 110, 1.3% B, A-C: B + P | Bond | 689 (100), 683 (99) | 883 (128), 883 (128) | 13.7, 16.5 | 19.6, 24.3 |
|  | O - Ni-Flex 110, 2.5% B, S + B + P | Base | 724 (105), 731 (106) | 896 (130), 903 (131) | 22.9, 18.5 | 34.5, 28.4 |
|  | I - Ni-Flex 110, 1.3% B, A-C: B + S + P | Base | 731 (106) | 731 (106) | 1.1 | 2.6 |
| 1255 (982, 1800) | Typical Value | Base | 655 (95) | 682 (125) | 18 | 45 |
|  | B - Ni-Flex 110, 2.5% B, S + B + S + P | Base | 703 (102) | 807 (117) | 4.1 | 6.9 |
|  | N - Ni-Flex 110, 1.3% B, A-C: B + P | Bond | 510 (74), 572 (83) | 710 (103), 683 (99) | 10.4, 8.1 | 16.8, 17.8 |
|  | O - Ni-Flex 110, 2.5% B, S + B + P | Base | 621 (90), 565 (82) | 696 (101), 717 (104) | 19.3, 19.5 | 26.3, 37.2 |
|  | I - Ni-Flex 110, 1.3% B, A-C: B + S + P | Base | 758 (110), 421 (61) | 820 (119), 421 (61) | 13.6, 4.6 | 21.4, 7.9 |

Notes:
N/S = Not Specified, N/R = Not Reported, A-C = As-Cast, B = Bond at 2400° F., S = Solution Treated at 2410° F., P = Precipitation Treated at 1975° F.

Single crystal patch or insert materials must have the same primary and secondary crystallographic orientations as the single crystal of the original component. Mismatch of crystallographic orientations will produce deleterious grain boundaries in repaired single crystal structures. SC inserts should be grown in the same orientation and at the same rate as the original structure to produce similarity of crystallographic alignment and structure.

Thermal processing of hybrid structures having sections of high performance single crystal material in combination with lower performance (but less expensive) DS or CC material is limited by the low temperature requirements of the DS or CC portions, and processing will be very similar to that employed for these materials. Processing of hybrid structures also requires elimination of the standard SC post bond solution heat treatment, as this would result in partial melting of the DS or CC component.

Figure 7:
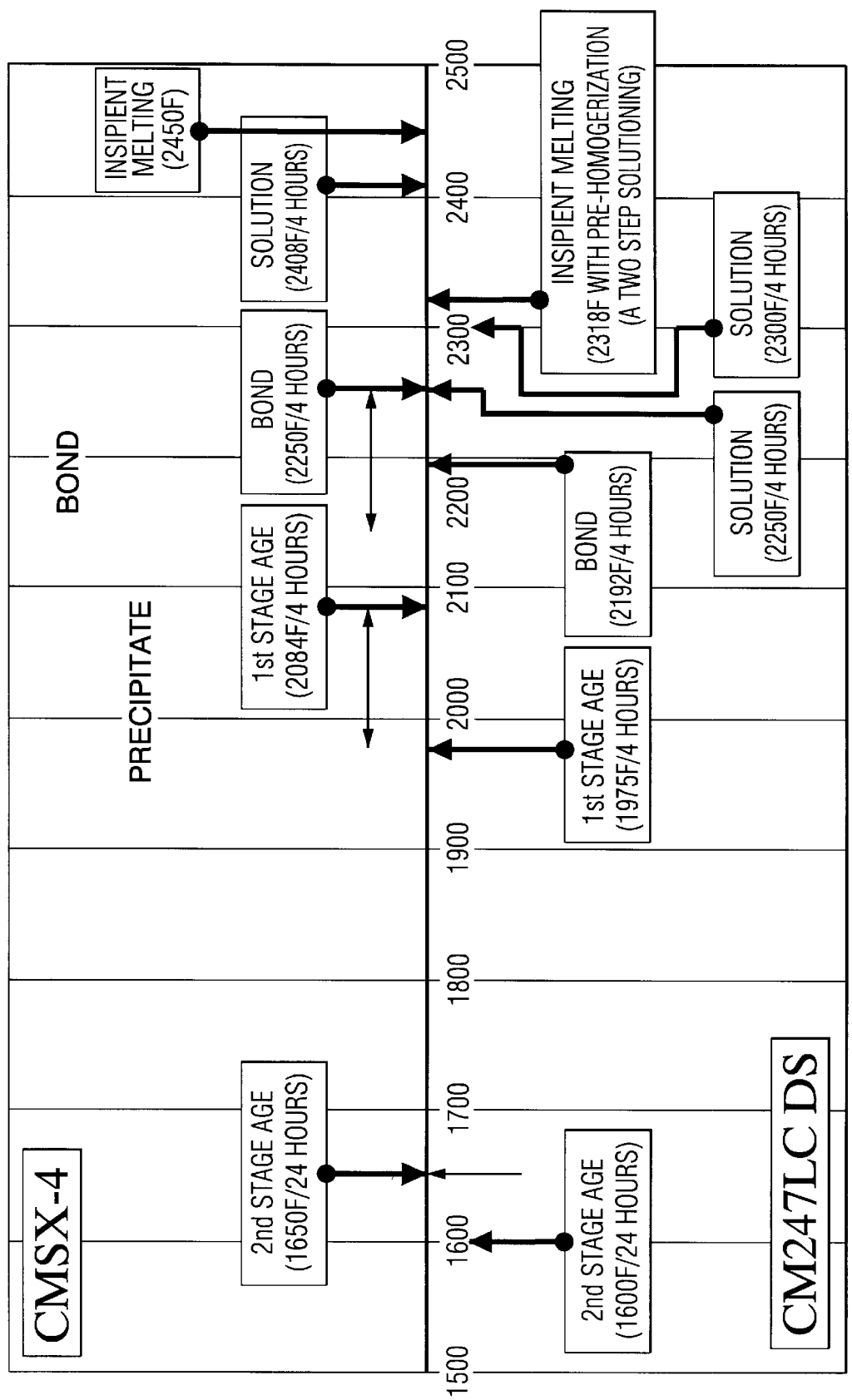
FIG. 7 is a graphical comparison of thermal processing requirements for typical SC and DS/CC nickel based superalloys.

For example, bonding for SC material is usually conducted at 2300° F., and a DS alloy is solution heat treated at 2200° F. Both materials can be precipitation heat treated at 1975° F. When the two materials are combined, a bonding cycle of 2200° F. will allow bonding of the SC and DS material and effectively provide solution heat treatment of the DS material. Subsequent precipitation heat treatment at 1975° F. will strengthen both alloys. Regardless of whether the SC material is solution heat treated prior to bonding, the properties of the SC material will be acceptable since the alloy has been bonded and heat treated according to Cycles N or O. FIG. 7 illustrates how the bonding and thermal processing cycles for SC and CC/DS materials compare to each other and how they can be resolved to develop a process to bond hybrid systems. This is possible using either heat treatment Cycles N or O of Table 5, with the temperatures listed in Table 6. Thus, it is possible to develop a heat treatment cycle for hybrid repair by integrating the two heat treatment processes as shown in Table 6.

TABLE 6

Heat treatment processes for hybrid materials (e.g., CMSX-4/CM247)

| Service Run | New "Insert" or Skin |
|---|---|
| Pre-treatment at 2100° F. to 2300° Co machine | Solution Heat Treatment >2400° F. |
| Bonding at 2100° F. to 2300° F. - solution treats the ex service DS/CC part | |
| Diffusion at 2100° F. to 2300° F. | |
| Primary aging 2100° F. to 2200° F. to regenerate gamma-prime structure in the SC portion | |
| Secondary aging 1900° F. to 2100° F. to regenerate gamma-prime structure in both the SC and DS/CC portions | |
| Coating, etc. | |

Crystallographic and structural matching of inserts for hybrid structures is required only when aligned structures will be joined together. For example, a single crystal thin wall insert bonded to an existing single crystal wall should be similarly aligned, as should a single crystal portion to be joined to a DS structure. Conversely, a single crystal insert to a polycrystalline, isotropic CC portion does not require alignment with the original structure.

The method of the present invention can be used to repair a variety of gas turbine engine components and/or portions of these. Processing conditions and steps will depend on the particular component being repaired and the nature of the insert or repair method.

Figure 8:
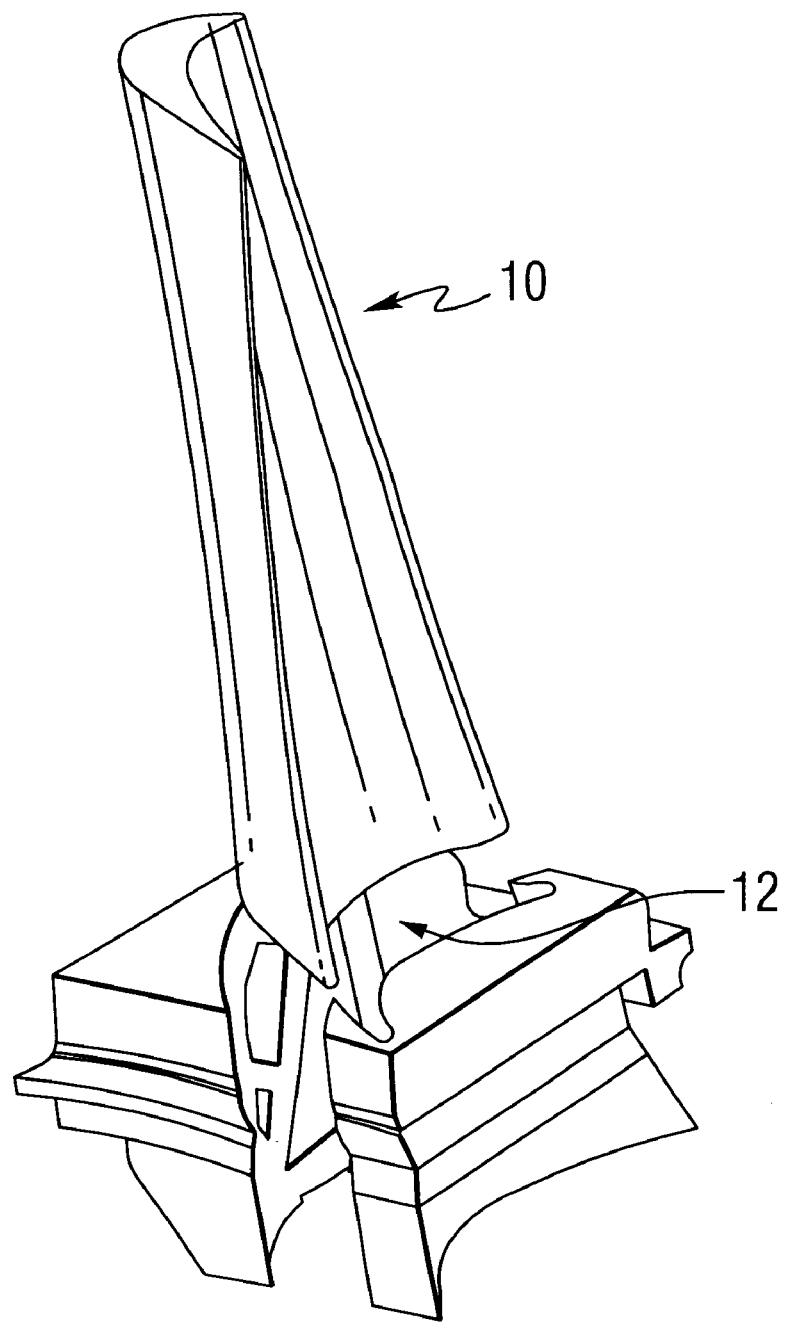
FIG. 8 shows replacement of a complete airfoil in a full blade configuration.

For example, repair of airfoils will, in some circumstances, require complete replacement of the airfoil. FIG. 8 illustrates how the process can be applied to replace a complete airfoil in a full blade configuration. In this situation, the replacement insert is an airfoil segment 10 produced without roots (providing material and processing cost savings). The original airfoil is cut off at the root 12, which is then sectioned vertically. Depressed sections are machined into the interior sections of the root segments to hold the new airfoil. By flaring the end of the airfoil and making the fitted sections at the top of the blade slightly reentrant, a physical, self locking bond and a metallurgical bond between the airfoil and root sections can be achieved. This process can also be applied to vane components wherein the root sections of the blade are replaced by the shroud sections of the vane.

Figure 9:
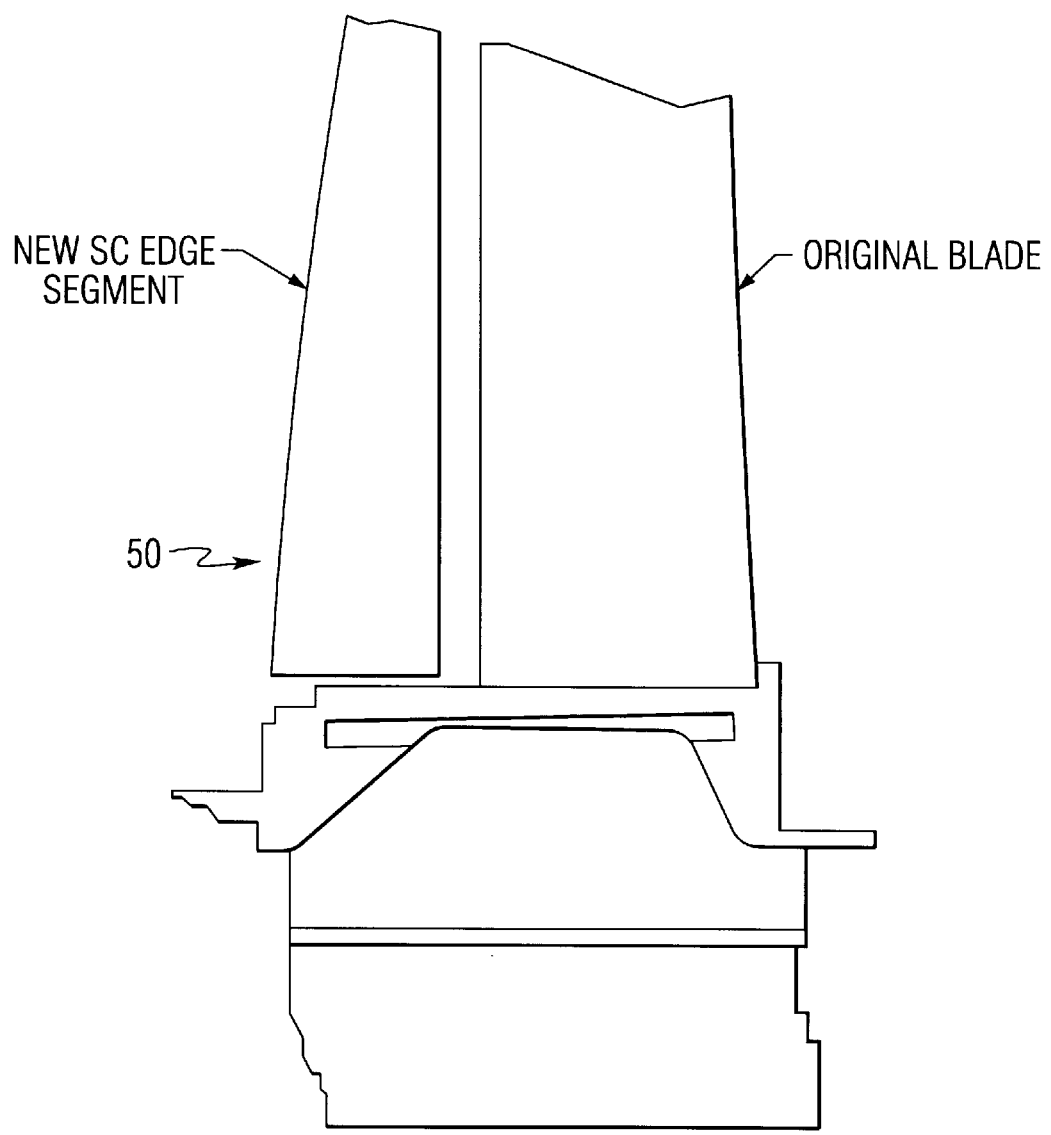
FIG. 9 illustrates replacement of leading edge of a blade for repair.

In some instances, it is feasible to replace a full length longitudinal section, such as a leading or trailing edge, of the airfoil, rather than replace the entire component. FIG. 9 illustrates how the repair would be accomplished. An insert 50 of the leading or trailing edge is prepared, and the damaged portion of the blade is extracted to accommodate the insert. The portions to be bonded are precisely machined.

In an alternative method of repairing airfoils, also within the scope of the present invention, the original blade root is not segmented and the insert is bonded to the original airfoil with a bond having some sections transverse to the axis of the airfoil. This is similar to the geometry of tip repair proposed in FIG. 5. Since this is known to be the direction of maximum stress, it is important that mechanical and thermal analysis be conducted to identify locations of the bond that are in areas of reduced stress and that one of these locations be used for the bond plane.

It is expected that some post bond processing will be required due to the geometric complexity of leading and trailing edges of advanced airfoils. Surface finishing and redrilling of cooling holes should be incorporated in a full-scale repair process for this application.

Figure 6:
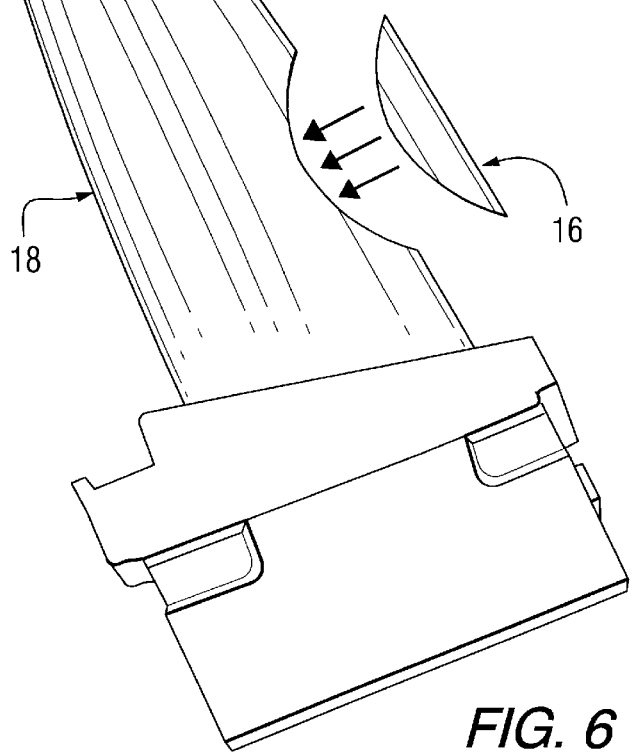
FIG. 6 shows a potential edge repair geometry for an aligned structure (SC or DS) airfoil.

In cases where damage to the airfoil is very localized, the method of the present invention can be used to repair partial sections of leading or trailing edges of the airfoil, rather than the entire leading or trailing edge. Referring to FIG. 6 which illustrates this concept, a partial section 16 of a Leading edge of an airfoil 18 is removed. Problems associated with transverse bond lines can be avoided by tapering the bondline profile so that the bond line is always inclined at an acute angle (i.e., significantly less than 90° to the axial major stress direction).

Replacement of a partial section of an airfoil allows for the reduction of trans-bond-plane stresses and facilitates precision fit up by co-machining. By contouring the roughly prepared pieces as arc segments, a precisely fitting bond joint can be prepared by Co-EDM or Co-ECM machining. Again, some post bond machining may be required to meet external, internal and cooling geometry dimensional requirements.

The use of insert sections and transient liquid phase bonding is particularly useful to replace the thin skin walled airfoils used on highly cooled blades. In these blades, the most extreme conditions are experienced by the thin wall or "skin" at the outer surface of the blade. Therefore, while this region provides only a minimal mass (and hence cost) of the blade, it sustains most of the damage. Replacement of this skin provides a new blade with minimal use of new material. This can be a considerable cost savings when the material is expensive single crystal.

Figure 10:
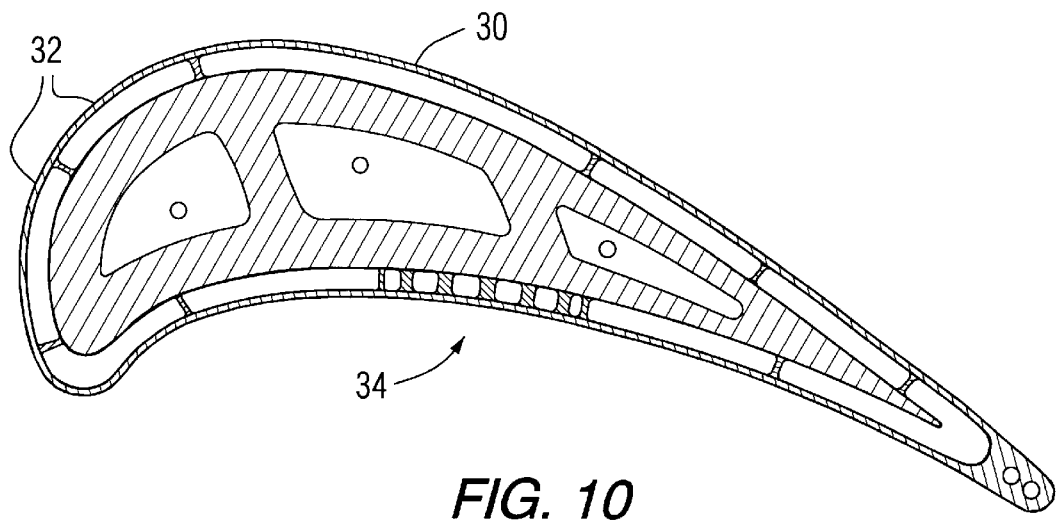
FIG. 10 is a cross sectional view of the thin wall construction of an airfoil.
Figure 11:
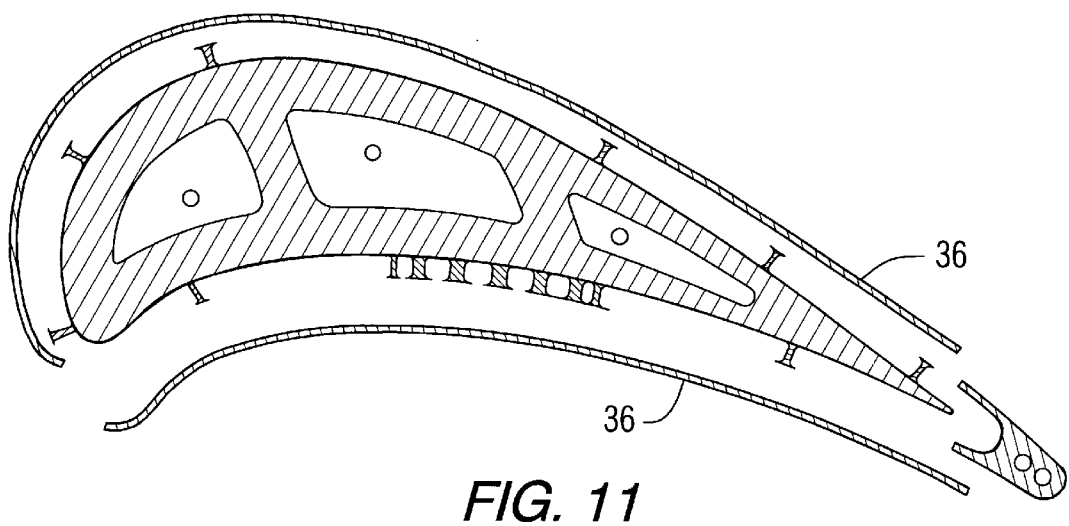
FIG. 11 is a schematic thin skin repair by transient liquid phase bonding of the airfoil.

A thin wall construction 30 is shown in FIG. 10. In many cases, the thin walled skin is segmented 32 into sections that lie between substantial supporting elements, that are often called walls or fins, and lie over pins 34. In this embodiment, the insert is actually a portion of a thin skin 36, shown in FIG. 11, effectively a patch. The patch geometry and profile can be conveniently selected to be any section that lies between the more substantial supporting elements of the walls or fins.

The old, damaged skin can be machined off, between the major supports to a depth at which the supporting pins are exposed. A contoured and machined patch section can then be applied and bonded in place to form a new skin.

In developing such a patch method, it is necessary for the transient liquid phase bonds to be produced across a well-fitted surface over the pin sections as well as across the edge sections that lie on the fins or walls. The sections should, therefore, be well contoured to match the basic blade profile shape. Such sections can be produced either by precision casting alone or casting plus superplastic forming to shape. Final co-machining by either EDM or ECM is required to ensure that the desired precise fit up is achieved. This process is particularly useful for "hybrid" blades wherein single crystal skins may be required for use over directionally solidified or polycrystalline substructures.

Figure 5:
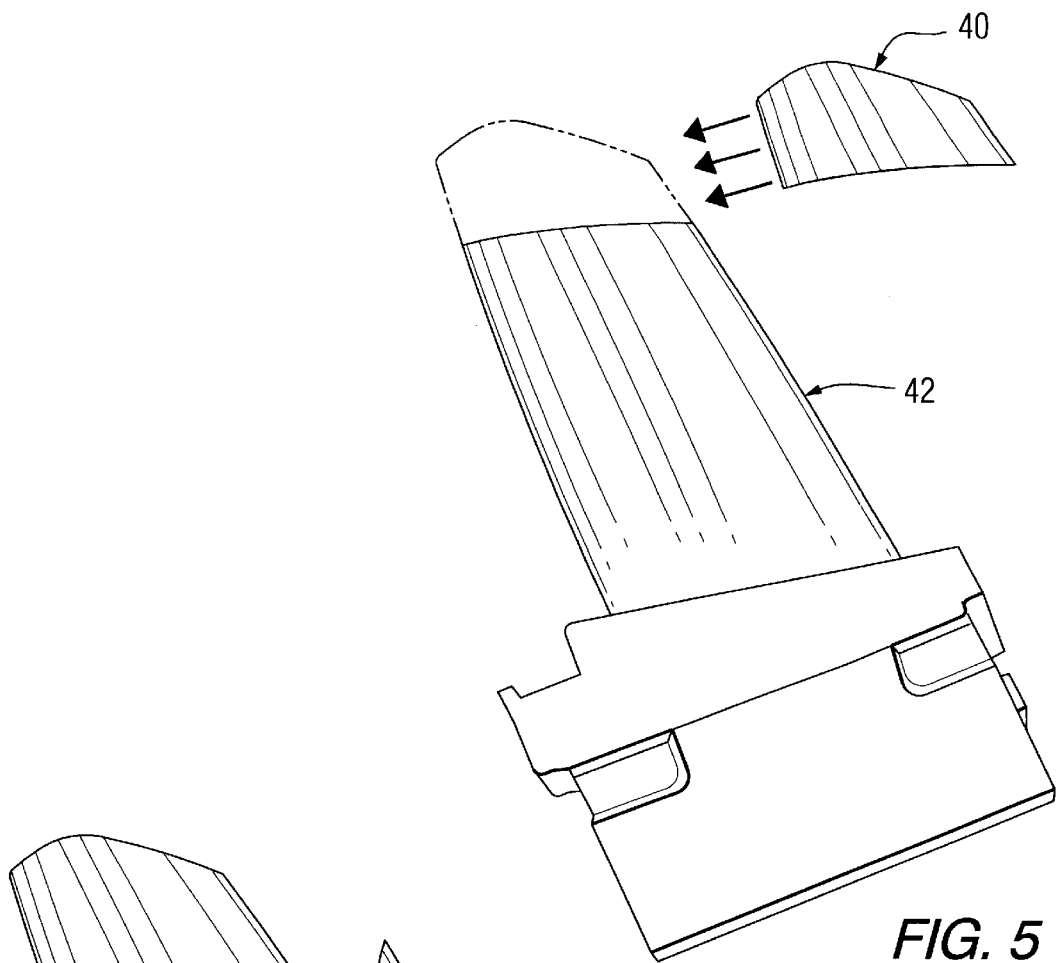
FIG. 5 is a perspective view showing a potential tip repair geometry for an aligned structure (SC or DS) blade tip.

Tips of blades can also be repaired with the method of the present invention, and insertion of replacement tips by transient liquid phase bonding is a straightforward process. The original blade tip is removed using a planar or regularly curved sectioning process and the insert, a new precast blade tip, is matched to the cut blade. Insert casting geometry and cutting processes for blade tips can be standarized and thus allow relatively simple matching of cut blade and insert. Co-machining or well fixtured independent machining can be employed to develop the surface profile matching needed for the transient liquid phase bonding process. FIG. 5 illustrates this aspect of the present invention, where a tip 40 is removed from the blade 42.

The inserts to be cast for tip replacements should be approximately 1" to 3" in length. The length of the replacement tips will be determined by the mechanical and thermal stress analyses. In general, the near tip regions of a blade are quite low stress regions with mechanical and thermal loads well below those experienced in other regions of the blade. Therefore, even a bond having a bond line transverse to the maximum stress axis (i.e., the axial direction of the blade) can withstand local mechanical conditions if the bond exhibits 80% of the base material properties.

EXAMPLE

Figure 12:
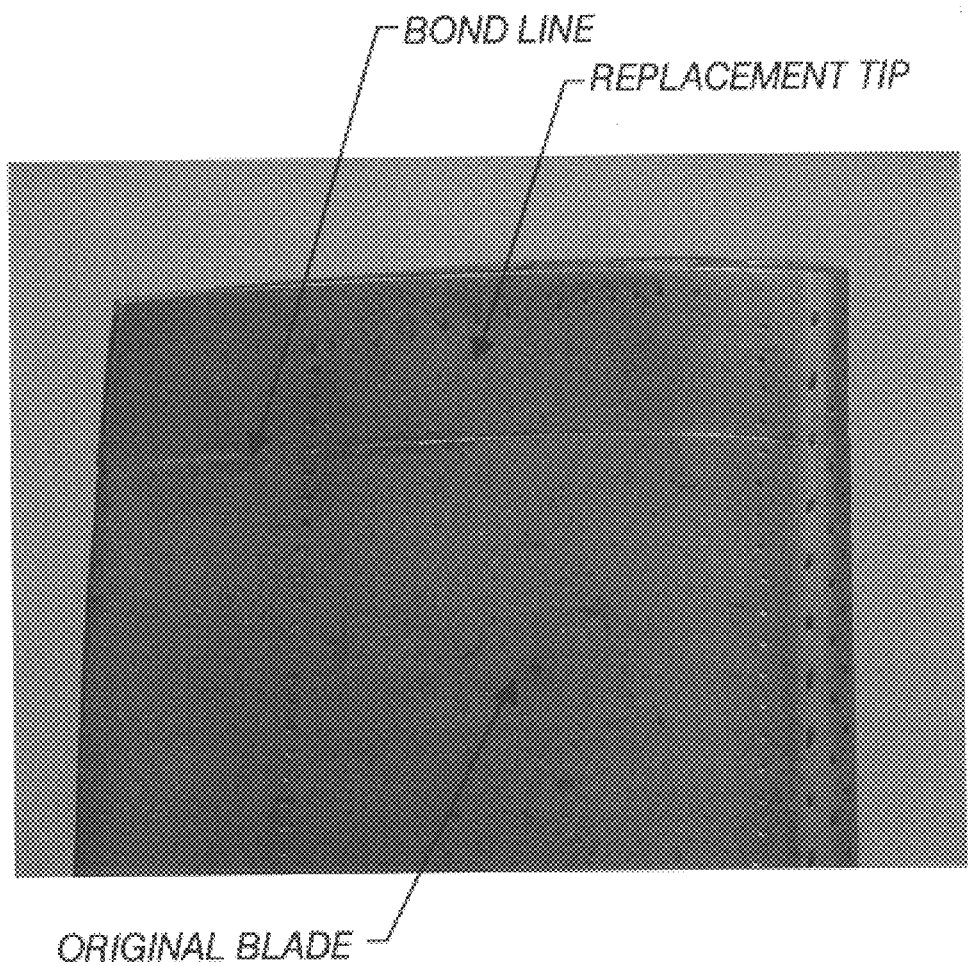
FIG. 12 is a photograph of a DS MarM002 blade tip repaired with transient liquid phase bonding.

A gas turbine engine blade of DS MarM002 alloy is shown in FIG. 12. This blade was damaged in the tip region, requiring replacement of the damaged portion. The damaged section was removed using conventional mechanical cutting and grinding. An insert was prefabricated by directionally casting a small replacement tip section according to the original geometry of the blade. The new tip was then mechanically machined to fit the remaining portion of the original blade. This insert was then attached to the original blade with NiFlex110-1.5B as identified in Table 2. A bonding temperature of 2150° F. for 8 hours was used, followed by diffusion/solution heat treatment at 2200° F. for 24 hours and precipitation treatments at 1975° F. for 2 hours and 1600° for 24 hours. Stress rupture testing of the repair bonded material indicated that about 95% of base material properties had been produced by the repair process.

While particular embodiments of this invention have been described above for the purposes of illustration, it will be evident to those skilled in the art that numerous variations of the details of the present invention may be made without departing from the invention as defined in the appended claims.

What is claimed is:

1. A method for repairing hot section gas turbine components comprising:

extracting a damaged portion of the gas turbine component;

fabricating an insert to replace the damaged portion;

precision machining and matchup of the insert to the component; and transient liquid phase bonding of the insert to the component using a bond medium and thermal process which optimize the mechanical and physical properties of the bond, wherein the repaired component has a structural bond that closely resembles the base material in structure, mechanical properties and performance.

2. The method of claim 1, wherein bond lines selected for repair are in low stress regions having local structural, mechanical and performance properties significantly below the properties of the base material and below the capabilities of the transient liquid phase bond.

3. The method of claim 1, wherein the transient liquid phase bonding uses a foil or paste applied in a thickness of about 0.0005 inches to about 0.010 inches.

4. The method of claim 3, wherein the transient liquid phase bonding material is comprised of between about 1 and 3% boron.

5. The method of claim 1, wherein the insert is a complete air foil section that is attached to an existing root or shroud section.

6. The method of claim 1, wherein the insert is a longitudinal section of an air foil such as a leading or trailing edge.

7. The method of claim 1, wherein the insert is a section of a blade tip.

8. The method of claim 1, wherein the insert is a section of a leading or a trailing edge of an air foil.

9. The method of claim 8, wherein the insert is shaped to minimize the existence of boundaries that lie transverse to the direction of maximum stress.

10. The method of claim 1, wherein the insert is a thin wall of an internally cooled airfoil.

11. The method of claim 1, wherein the gas turbine component and the insert are both comprised of polycrystalline or conventionally cast material.

12. The method of claim 11, wherein the thermal cycle step of the bonding process is controlled to rejuvenate the gamma prime microstructure of the gas turbine component and reprecipitate a near optimum microstructure in the repaired component.

13. The method of claim 1, wherein the gas turbine component and the insert are both directionally solidified material.

14. The method of claim 13, wherein the thermal cycle step of the bonding process is controlled to rejuvenate the gamma prime microstructure of the gas turbine component and reprecipitate a near optimum microstructure in the repaired component.

15. The method of claim 1, wherein the gas turbine component and the insert are both a single crystal material.

16. The method of claim 15, wherein the thermal cycle step of the bonding process is controlled to rejuvenate the gamma prime microstructure of the gas turbine component and to subsequently reprecipitate a near optimum microstructure in the repaired component.

17. The method of claim 1, wherein the gas turbine component is a directionally solidified or conventionally cast material and the insert is a single crystal material.

18. The method of claim 17, wherein the thermal cycle step of the bonding process is controlled to rejuvenate the gamma prime microstructure of the gas turbine component and reprecipitate a near optimum microstructure in the repaired component.

* * * * *